(12) United States Patent
Willuweit

(10) Patent No.: US 8,496,120 B2
(45) Date of Patent: Jul. 30, 2013

(54) FILTER NETWORK

(75) Inventor: Thomas Willuweit, Hof (DE)

(73) Assignee: IFE Innovative Forschungs-und Entwicklungs GmbH & Co. KG, Harrislee (DE)

( * ) Notice: Subject to any disclaimer, the term of this patent is extended or adjusted under 35 U.S.C. 154(b) by 420 days.

(21) Appl. No.: 12/988,294

(22) PCT Filed: Apr. 20, 2009

(86) PCT No.: PCT/EP2009/002867
§ 371 (c)(1),
(2), (4) Date: Oct. 15, 2010

(87) PCT Pub. No.: WO2009/127436
PCT Pub. Date: Oct. 22, 2009

(65) Prior Publication Data
US 2011/0036778 A1    Feb. 17, 2011

(30) Foreign Application Priority Data

Apr. 18, 2008  (DE) .......................... 10 2008 019 611
Dec. 5, 2008  (DE) .......................... 10 2008 060 723

(51) Int. Cl.
*B01D 29/00*   (2006.01)
*B01D 29/46*   (2006.01)

(52) U.S. Cl.
USPC ................ 210/489; 55/485; 55/486; 95/90; 95/273; 96/154; 210/683; 210/767; 210/660; 210/749; 210/335

(58) Field of Classification Search
USPC ... 55/485, 486; 95/90, 273; 96/154; 210/489, 210/660, 683, 747, 749, 767
See application file for complete search history.

(56) References Cited

U.S. PATENT DOCUMENTS 5,118,330 A * 6/1992 Gielow et al. .................. 95/284
6,238,464 B1   5/2001 Dullien

FOREIGN PATENT DOCUMENTS

| AT | 149 999 B | 6/1937 |
| EP | 0 391 041 A2 | 10/1990 |
| FR | 2 769 517 A1 | 4/1999 |
| GB | 1 372 561 A | 10/1974 |
| WO | WO 03/024565 A1 | 3/2003 |

* cited by examiner

*Primary Examiner* — Dirk Bass
(74) *Attorney, Agent, or Firm* — Kilpatrick Townsend & Stockton LLP

(57) ABSTRACT

The present invention relates to a filter unit for cleaning fluids, filter systems comprised of a plurality of said filter units, and the use of the filter unit or of the filter systems for filtering sludge and floating algae from water, or for purifying gases.

27 Claims, 5 Drawing Sheets

FILTER NETWORK

The present application is a U.S. National Phase of PCT/EP2009/002867, filed Apr. 20, 2009, which claims the benefit of German Application Nos. 10 2008 019 611.8, filed on Apr. 18, 2008, and 10 2008 060 723.1, filed on Dec. 5, 2008, the disclosures of which are hereby incorporated herein by reference in their entirety.

The present invention relates to a filter unit for the cleaning of fluids according to claim 1, filter systems composed of a plurality of filter units of this type according to claims 18 and 19 and the use of the filter unit or the filter systems for filtering off sludge and floating algae from water or for cleaning gases according to claims 23 and 25.

Beautiful ponds with clear water are the aim of all pond owners. The care of ponds, particularly when they are stocked with fish is, however, beset with typical problems. A fluctuating oxygen supply, caused by high fish stock densities and/or large quantities of rotting dead algae, lead to huge problems for the organisms in the water. Living algae are indispensible for a functioning garden pond as they produce oxygen and are the lowest member in the food chain, but an unchecked growth of algae leads to a reduction in what is known as the carbonate hardness and to pH fluctuations of the water so the biodiversity is reduced and individual algal species can occur in large quantities. The food enemies of the algae—tiny crustaceans—are also impaired by pH fluctuations. These are the most important reasons why garden ponds do not function properly. In addition, garden ponds silt up rapidly.

In the prior art, apart from chemical means such as algaecides, physical means such as filters are also used to combat algae. Many pond owners tend to use a filter for ecological reasons. The advantages of filters are ecological safety and low operating costs. On the other hand, the drawbacks are that not all algae can be filtered off, and that the filters easily clog, to which, in particular, the sludge present in ponds also contributes. As result, the filtering speed drops and frequent cleaning operations are required.

Some of these problems are eliminated, for example, by the pond filtering system described in WO 03/024565. The filter block used is composed in a pyramid-like manner from a plurality of layers of filter material. Each layer of filter material in turn consists of a plurality of filter foam elements glued or welded to one another with an octagonal cross-section and corresponding inlets and outlets. Economically problematical here is the waste from standard mats made of filter foam caused by the special pyramid-like geometry of the filter block and the layers of octagonal filter foam elements forming the latter, which may be 50% and more, and the connection of the octagonal filter foam elements to form a layer of the filter block, which is not readily possible mechanically.

The object of the invention is to avoid the problems discussed above of the prior art.

According to the invention, this object is achieved by a filter unit for the cleaning of fluids according to claim 1 and/or filter systems composed of a plurality of filter units of this type according to claims 18 and 19. The invention also relates to the use of the filter unit claimed or the claimed filter systems for filtering off sludge and floating algae from water or for cleaning gases according to claims 23 and 25.

Advantageous and/or preferred embodiments of the invention are the subject of the sub-claims.

The present invention is now to be described in more detail without restriction and merely for illustration.

It is clear that the invention cannot only be applied to ponds, but to water in general. Water in the sense of this invention is therefore taken to mean both fresh water and sea water sites, natural bodies of water, fish breeding stations including their spawning tanks, aquariums, fishing recirculation systems etc.

The invention also relates to a filter unit for cleaning fluids, i.e. gases or liquids, such as air or water, which is characterised by a plurality of longitudinal and transverse elements 1, 5 made of at least one filter material which is permeable to the fluids, which are connected to one another in such a way that a network with a plurality of meshes 20 is formed, by means of which the fluids enter the fluid unit and can come into contact with the filter material forming the network, and also by a plurality of openings or hollow channels 10 extending from junction points formed by the longitudinal and transverse elements 1, 5 of the network, for example holes or stampings of any shape, for example triangular, square, hexagonal or octagonal, through which the cleaned fluids can leave the filter unit. The openings 10 may extend along all three spatial axes through the junction points of the network, so an inner three-dimensional network of channels in fluid communication with one another is produced in the actual filter material network. The openings preferably only extend, however, along the flow direction of the fluid through the junction points of the network.

The size of the openings, for example in the case of a hole, the diameter thereof, is not subject to any particular restrictions. Sufficient surrounding filter material should merely still remain such that the stability of the network is not impaired and no uncleaned fluid, for example, dirty water can penetrate into the openings. Suitable dimensions can be determined by a few simple routine tests. In the case of filter foam, the thickness of the filter material surrounding the opening should be about 3 to 4 cm or even more, for example.

Depending on application, the filter material may, for example, be air-permeable, water-permeable or air and water-permeable. The filter material is not subject to any particular restrictions as long as it fulfils its purpose. Filter materials of a suitable structure and/or suitable pore size can be commercially obtained. It is clear that the filter material used should be adequately stable with respect to the fluid, in other words hydrolytically stable to clean water. Obviously, a plurality of filter materials may be combined with one another.

A network of filter material is formed from longitudinal and transverse elements 1, 5. The length, width and depth of the elements are not subject to any particular restrictions and are easy to adapt to the application or to an existing filter housing. The cross-section may also be as desired, for example circular, oval, square, rectangular, hexagonal or octagonal. Square or rectangular cross-sections are particularly suitable.

The longitudinal and transverse elements 1, 5 of the filter material may be flexible or rigid depending on the material selected. If the longitudinal and transverse elements 1, 5 are flexible, they are preferably interwoven. If, on the other hand, they are rigid, they are preferably simply stacked on top of one another. However, it is clear that the flexible longitudinal and transverse elements 1, 5 could also be stacked. The spacing between the individual longitudinal and transverse elements 1, 5 is not subject to any particular restrictions. The spacings may be same or different. By selecting suitable spacings, the filtering speed and the filtering performance can be controlled.

It is clear that instead of stacking longitudinal and transverse elements 1, 5 on top of one another and connecting them to one another, the same function can also be fulfilled by a solid block of filter material with suitable dimensions, through which a plurality of vertical and horizontal openings extend, so a three-dimensional network or grid is produced. The openings, though which the cleaned fluids can leave the filter unit, then extend again in the flow direction of the fluids to be cleaned through the junction points of this grid.

Suitable flexible filter materials are, for example, webs of natural and synthetic materials, such as mats, strips or threads of, for example, coconut fibre, cork, sisal, hemp, straw, woven fabrics such as silk, cotton, cloth, paper, polymers, plastics materials, foams, metal threads, iron wool, graphite, glass wool, which may optionally be hydrophilised or hydrophobised. Hydrophilisation may take place as a function of the application, for example by treatment with solutions of starch, cellulose or salts. Hydrophobing may take place as a function of the application, for example by treatment with silanes, waxes or hydrocarbons. Hydrophobised glass wool has the further advantage of an extremely good oil binding capacity.

Suitable rigid filter materials are, for example, formed strips of natural or synthetic materials, such as porous ceramic, sintered glass materials or sintered plastics materials.

It is clear that the longitudinal and transverse elements 1, 5 forming the network do not have to consist of the filter material. Also suitable are, for example, elongate pouches or hoses of suitable dimensions, which are permeable to the fluid, for example water-permeable, and contain a filter material in comminuted form. This embodiment has the advantage that, apart from the filter material, auxiliary materials may also be contained, for example binding agents such as ion exchangers (cations and anions), activated carbons, phosphate binders (for example calcium peroxide, iron(II) and iron(III) oxides and hydroxides (also mixed), hydroxides and carbonates of subgroup elements, in particular lanthanum salts), chemical catalysts to improve the cleaning performance or nutrient deposits (carbon, phosphorous, nitrogen sources) or combinations thereof. It is also possible to impregnate longitudinal and transverse elements made of filter material with suitable auxiliary materials.

The described flexible and rigid longitudinal and transverse elements 1, 5 can, of course, also be combined with one another and with the elongate pouches or hoses described in the previous paragraph, which contain comminuted filter material and optionally auxiliary materials.

A particularly suitable filter material is filter foams, which, for example for cleaning water, are hydrolytically stable and are open-pored and have a porosity in the range of ppi 10 to ppi 100. ppi means "pores per inch". Suitable filter foams can be commercially obtained including, for example, those which are based on a polyurethane, polyethylene, polypropylene, polyether or polyester foam. In this embodiment, the longitudinal and transverse elements 1, 5 are preferably formed in an undulating manner from the filter foam and are interwoven to form the network in such a way that the wave valleys of the longitudinal elements 1 engage in the wave peaks of the transverse elements 5 and vice versa. The waves preferably have the shape of an isosceles trapezium.

Obviously, two or more of the filter units according to the invention can be combined to form a filter system with a plurality of layers of filter units, specifically such that the openings 10 extending through the junction points formed by the longitudinal and transverse elements 1, 5 of the network are in fluid combination with one another. The filtering path and the filtering performance are thereby increased. It is clear that the individual layers of filter units are optionally suitably sealed with respect to one another, so no fluid can seep in between and no fluid that is still soiled is mixed again with already cleaned fluid.

In a further configuration of the filter system according to the invention, at least two filter units according to the invention can be combined with one another in such a way that the openings 10 extending through the junction points of the filter material network of the first filter unit are in fluid communication with the meshes 20 of the filter material network of the at least second filter unit, so the cleaned fluids leaving the junction openings 10 of the first filter unit come into contact with the filter material of the at least second filter unit and can leave said second filter unit further cleaned by the junction openings 10 of the filter material network thereof. This can take place in that, for example, two or more filter units according to the invention are accordingly combined with one another displaced or offset parallel to one another in such a way that junction openings 10 and meshes 20 alternately come to rest above one another. The resulting filter system then has the spatial form of a parallelepiped. Alternatively, a cube or cuboid shape of the filter system according to the invention can be achieved in that two different types of filter units with correspondingly offset junction openings 10 and meshes 20 are combined alternately with one another. This embodiment has the advantage that conventional commercial filter housings can be used, the filter receiving space of which is, for example cube-like or cuboid. It is clear that the individual layers of filter units are optionally sealed with respect to one another so no fluid can seep in between and no fluid that is still soiled is again mixed with already cleaned fluid. The porosity of the filter materials of the at least two filter units may advantageously increase in the flow direction of the fluids, i.e. the filter material becomes finer in the flow direction and can filter off smaller particles. This produces a further improvement in the filtering performance.

In a further embodiment of the filter system according to the invention, a deflection unit 50 is located between two respective adjacent filter units, in a sandwich-like manner, and has a lower and an upper surface element 25, 40 made of a material, which is impermeable to the fluids, for example a film or plate made of plastics material or metal, with an intermediate space defined thereby, the lower and the upper surface element 25, 40 being provided in a sieve-like manner with a plurality of openings 30, 45, which are arranged in such a way that the openings of the lower surface element 30 are in fluid communication with the junction openings 10 of the filter network material of the first filter unit and the openings of the upper surface element 45 are in fluid communication with the meshes 20 of the filter network material of the at least second filter material so the cleaned fluids leaving the junction openings 10 of the first filter unit enter the at least second filter unit via the intermediate space of the deflection unit 50 and come into contact with the filter material thereof and can leave said second filter unit further cleaned by the junction openings 10 of the filter material network thereof. The intermediate space between the lower and upper surface element can be defined by spacers, which extend in a box-like manner along the edges of the surface elements. If the lower and upper surface elements 25, 40 are, for example, a film, further support elements may be provided on the surface area to increase the mechanical stability. These may have any shape, for example cuboid or cylindrical or else flat and be arranged in any manner with respect to one another. What is known as spacer fabric (specialist term from textile technology) with pull threads (spacer threads) extending in the flow direction of the fluids or a coarse braided fabric, such as, for example, what is known as a "Japan mat" (specialist term from fish keeping), which acts as a coarse filter, may advantageously be located in a further embodiment of the invention in the intermediate space defined by the lower and the upper surface element 25, 40 of the deflection unit 50. Silver threads or adsorbents, for example activated carbon, zeolites, ion exchangers, clay materials, which additionally have a disinfecting or antimicrobial or cleaning effect, can be incorporated in the spacer fabric. Advantageously, the porosity of the filter materials of the at least two filter units can increase in the flow direction of the fluids. This produces a further improvement in the filtering performance.

The filter units according to the invention or filter systems according to the invention composed of a plurality of filter units of this type may be used in any filter housings, The shape and dimensions are not subject to any particular restrictions. The filter units according to the invention are inserted with such a precise fit in the housing that no or only very little fluid that is still soiled can seep along unfiltered between the side walls of the housing and the filter units. Suitable filter housings are commercially available.

The filter housings have an inlet for, for example, dirty water from, for example, a pond as well as an outlet for cleaned water. The dirty water is generally supplied by means of a suitable pump. The dirty water can optionally be irradiated with ultraviolet light of a suitable wavelength before entering the filter housing to kill bacteria and algae, for example thread algae. The filter units or filter systems according to the invention are suitable both for upflow and downflow operation. In upflow operation, the dirty water is pumped through the filter vertically from below against gravity. In downflow operation, it runs vertically from above under the action of gravity through the filter. Obviously, however, the flow direction could also be horizontal.

Filter housings for upflow operation suitably have a cover plate made, for example, of plastics material or metal which is provided in the manner of a sieve with a plurality of openings, which are arranged in such a way that they are in fluid communication with the junction openings 10 of the filter network material of the uppermost filter unit. The discharging cleaned fluid, for example water, then runs out via an overflow or is pumped off. Soiled fluid, for example dirty water, is fed through a base plate made, for example, of plastics material or metal, on which the filter unit according to the invention or the filter system according to the invention rests, and which is provided in a sieve-like manner with a plurality of openings, which are arranged in such a way that they are in fluid communication with the meshes 20 of the filter network material of the lowermost filter unit. The conversion of upflow operation into downflow operation takes place simply by exchanging the cover plate and base plate.

The filter units according to the invention and filter systems according to the invention are suitable, for example, for filtering off sludge and floating algae from water, such as pond or aquarium water, or else for cleaning gases such as air or waste gases, for example in vacuum cleaners or bio-filters for industrial application.

The invention will be further described below by way of example with the aid of the accompanying figures.

FIG. 1 shows an embodiment of a filter unit according to the invention in a side view, in which the longitudinal elements 1 and the transverse elements 5 of the network are formed in an undulating manner and are interwoven in such a way that the wave valleys of the longitudinal elements 1 engage in the wave peaks of the transverse elements 5 and vice versa. In this embodiment, the waves have the shape of an isosceles trapezium. Openings 10, which are shown here by dashed lines, extend through the junction points formed by the longitudinal and transverse elements 1, 5 of the network. The flow direction of the fluid to be cleaned, for example water, is illustrated by arrows. In this embodiment, the filter element is loaded with the fluid in the upflow operation. The fluid is thus fed from below and firstly penetrates into the cavities 15, which have a wedge-shaped cross-section here. The wedge-shape is caused here by the trapezoidally undulating longitudinal and transverse elements 1, 5 which are interwoven. Depending on the shape and type of connection of the longitudinal and transverse element 1, 5, other cross-sectional shapes are, of course, also produced. However, this has no influence on the function.

FIG. 2 is a perspective view of the above-described filter element shown in FIG. 1. It is seen that the wedge-shaped cavities or openings 15 extend substantially parallel to one another through the entire filter element, specifically both in the X- and Y-direction, so they intersect and are in fluid communication with one another. Cavities or openings, called meshes 20 here, which are in fluid communication with the wedge-shaped cavities or openings 15, are thereby formed in the Z-direction at the crossing points. The meshes 20 of the filter network are thus formed, through which the fluid to be cleaned can enter the filter element and can come into contact with the filter material.

FIGS. 3 to 6 show how a plurality of the filter elements shown in FIG. 2 is combined to form a filter system according to the invention.

FIG. 3 shows a lower surface element 25 of a deflection unit 50 (shown completely in FIG. 6) made of a material which is impermeable to the fluids, which is provided in the manner of a sieve with a plurality of openings 30, which are arranged in such a way that they are in fluid communication with the junction openings 10 of the filter network material of the (first) filter unit located therebelow.

FIG. 4 shows a planar spacer 35, which rests on the lower surface element 25.

FIG. 5 shows an upper surface element 40 made of a material which is impermeable to the fluids and is provided in a sieve-like manner with a plurality of openings 45, which are arranged in such a way that they are in fluid communication with the meshes 20 of the filter network material of the (second) filter unit located thereabove.

Figure 1:
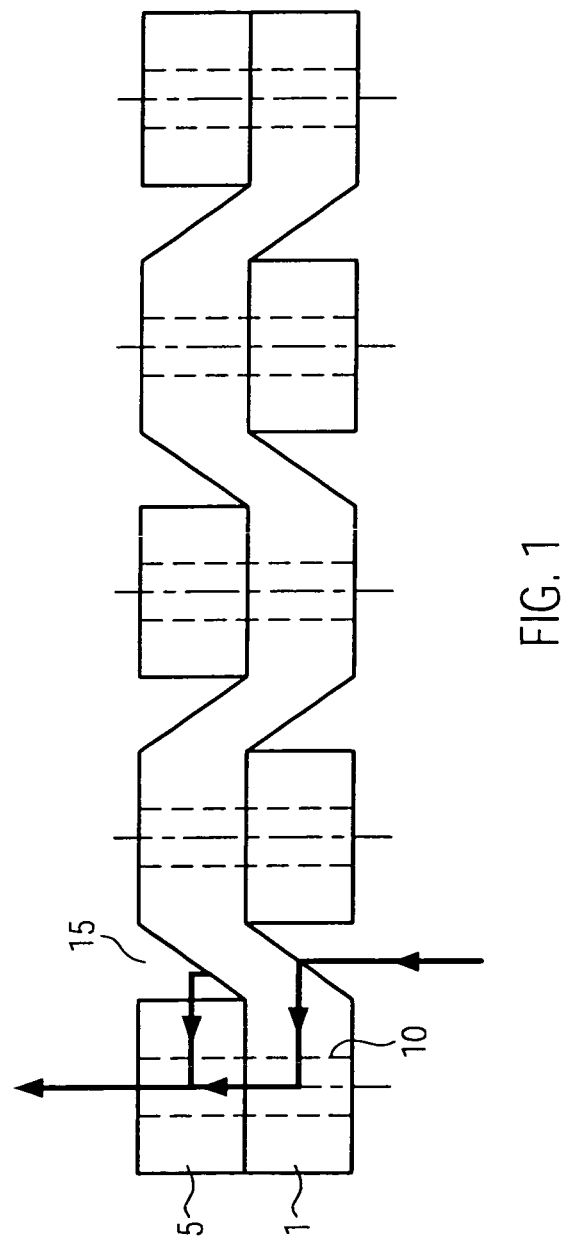
Figure 2:
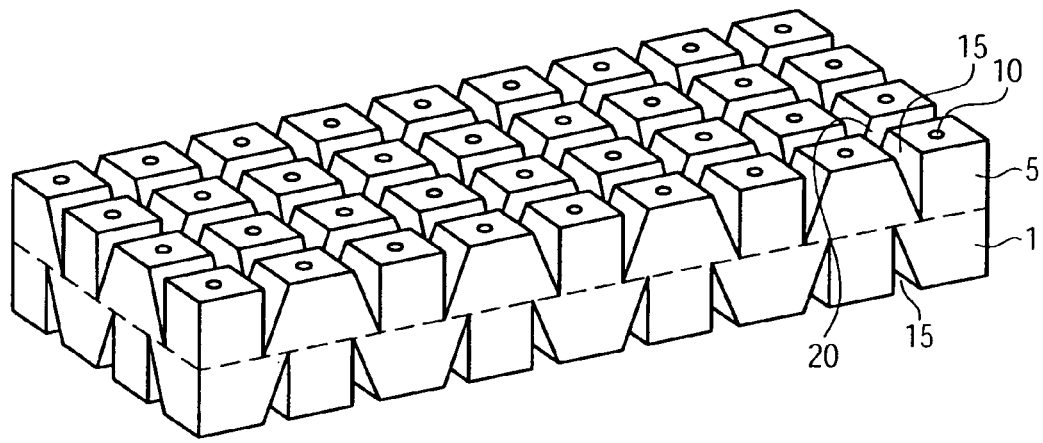
Figure 3:
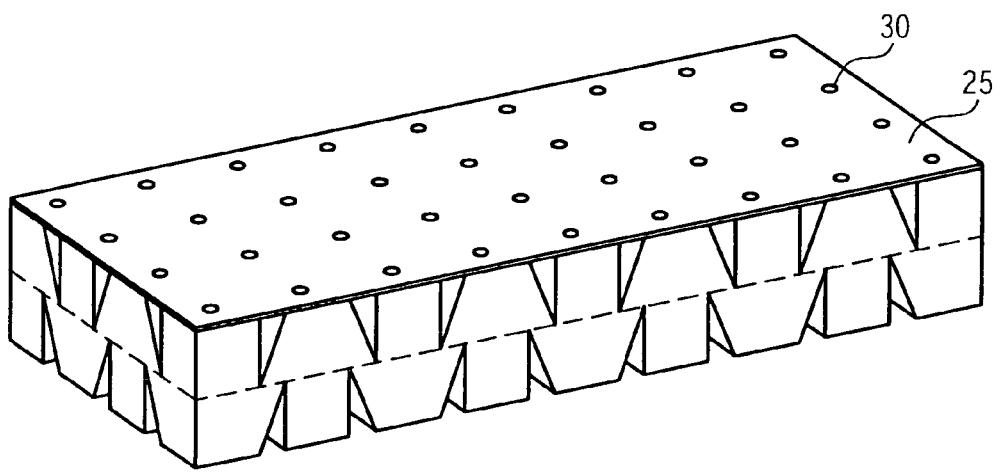
Figure 4:
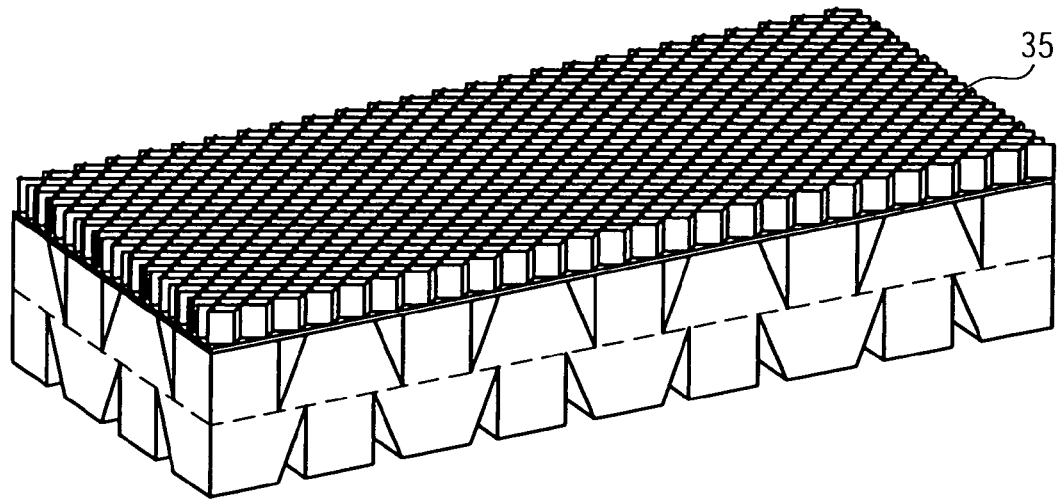
Figure 5:
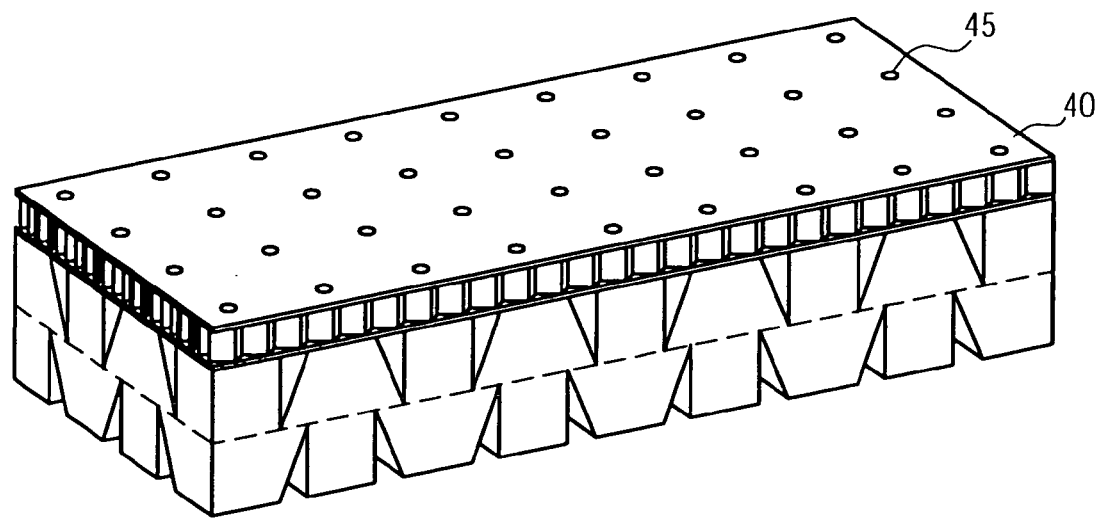
Figure 6:
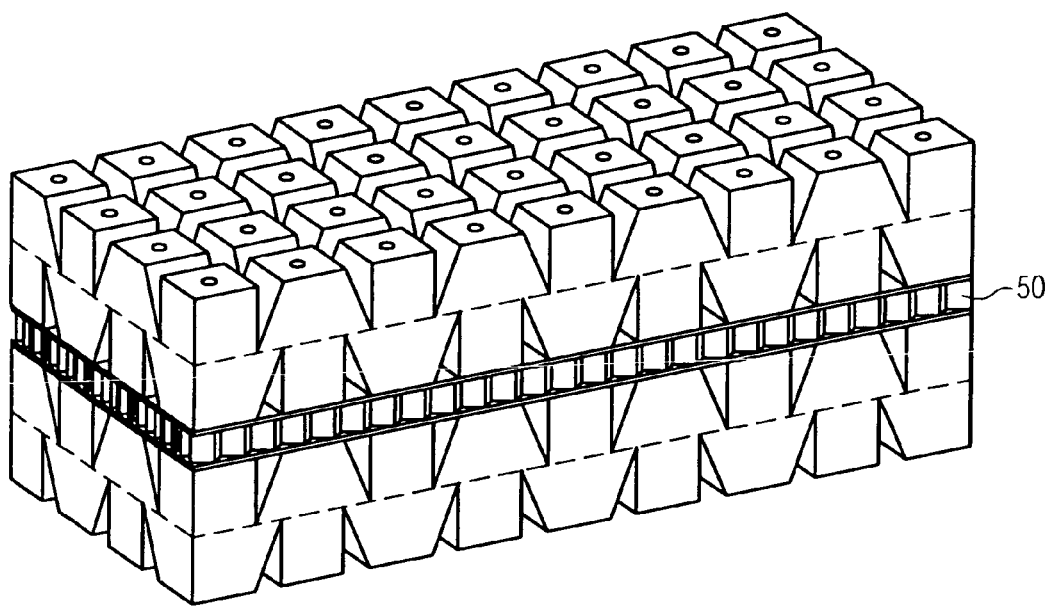
FIG. 6 shows a filter system with two filter units, between which a deflection unit 50 is located.
Figure 7:
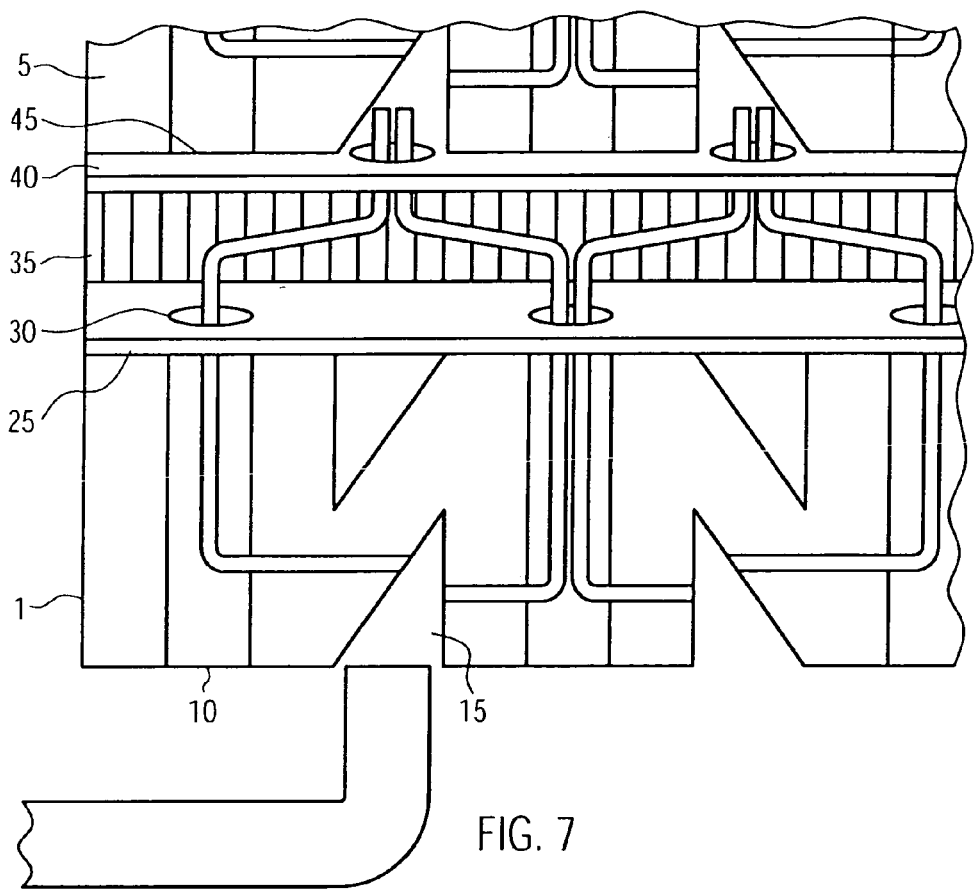
FIG. 7 shows the fluid flow through the filter element or filter system shown in the above figures in detail.

The invention claimed is:

1. Filter unit for the cleaning of fluids, characterised by a plurality of longitudinal and transverse elements (1, 5) made of at least one filter material which is permeable to the fluids, which are connected to one another in such a way that a network with a plurality of meshes (20) is formed, through which the fluids enter the filter unit and can come into contact with the filter material forming the network, and also by a plurality of openings (10), which extend through the junction points formed by the longitudinal and transverse elements (1, 5) of the network and through which the cleaned fluids can leave the filter unit, and further characterised in that the longitudinal and transverse elements (1, 5) of the network are undulating in shape and are interwoven in such a way that the wave valleys of the longitudinal elements (1) engage in the wave peaks of the transverse elements (5) and vice versa, and that the waves have the shape of an isosceles trapezium.

2. Filter unit according to claim 1, characterised in that the filter material is air-permeable.

3. Filter unit according to claim 1, characterised in that the filter material is water-permeable.

4. Filter unit according to claim 1, characterised in that the longitudinal and transverse elements (1, 5) of the filter material, if it is flexible, are interwoven.

5. Filter unit according to claim 1, characterised in that the longitudinal and transverse elements (1, 5) of the filter material, if it is rigid, are correspondingly stacked.

6. Filter unit according to claim 1, characterised in that the filter material consists of webs of natural or synthetic materials.

7. Filter unit according to claim 1, characterised in that the filter material consists of rigid formed strips made of natural or synthetic materials.

8. Filter unit according to claim 1, characterised in that the longitudinal and transverse elements (1, 5) forming the network are pouches of corresponding dimensions which are permeable to the fluid and which contain the filter material in comminuted form.

9. Filter unit according to claim 2, characterised in that the filter material is a hydrolytically stable open-pore filter foam.

10. Filter unit according to claim 9, characterised in that the hydrolytically stable filter foam has a porosity in the range of ppi 10 to ppi 100.

11. Filter unit according to claim 9, characterised in that the hydrolytically stable open-pore filter foam is based on a polyurethane, polyethylene, polypropylene, polyether or polyester foam.

12. Filter unit according to claim 3, characterised in that at least one longitudinal or transverse element (1, 5) of the network has or is at least one auxiliary material in a water-permeable jacket.

13. Filter unit according to claim 12, characterised in that the auxiliary material is an ion exchanger, activated carbon, phosphate binder, nutrient deposit, or a combination thereof.

14. Filter unit according to claim 13, characterised in that the phosphate binder is calcium peroxide, iron(II) or iron(III) oxide or hydroxide, and hydroxide or carbonate of the subgroup elements.

15. Filter unit according to claim 1, characterised in that the filter medium also has chemical catalysts to improve the cleaning performance.

16. Filter system, comprising at least two filter units according to claim 1, which are combined in such a way that the openings (10) extending through the junction points formed by the longitudinal and transverse elements (1, 5) of the network are in fluid communication with one another.

17. Filter system, comprising at least two filter units according to claim 1, which are combined with one another in such a way that the openings (10) extending through the junction points of the filter material network of the first filter unit are in fluid communication with the meshes (20) of the filter material network of the at least second filter unit in such a way that the cleaned fluids leaving the junction openings (10) of the first filter unit come into contact with the filter material of the at least second filter unit and can leave said second filter unit further cleaned by the junction openings (10) of the filter material network thereof.

18. Filter system according to claim 16, characterised in that a deflection unit (50) is located between two respective adjacent filter units in a sandwich-like manner and has a lower and an upper surface element (25, 40) made of a material, which is impermeable to the fluids, with an intermediate space defined thereby, the lower and the upper surface element (25, 40) being provided in the manner of a sieve with a plurality of openings (30, 45), which are arranged in such a way that the openings of the lower surface element (30) are in fluid communication with the junction openings (10) of the filter network material of the first filter unit and the openings of the upper surface element (45) are in fluid communication with the meshes (20) of the filter network material of the at least second filter unit, so the cleaned fluids leaving the junction openings (10) of the first filter unit enter the at least second filter unit via the intermediate space of the deflection unit (50) and come into contact with the filter material thereof and can leave said second filter unit further cleaned by the junction openings (10) of the filter material network thereof.

19. Filter system according to claim 17, characterised in that the porosity of the filter materials of the at least two filter units increases in the flow direction of the fluids.

20. Filter unit according to claim 18, characterised in that a spacer fabric with pull threads extending in the flow direction of the fluids is located in the intermediate space defined by the lower and the upper surface element (25, 40) of the deflection unit (50).

21. A method for filtering water or gas, comprising passing the water or gas through the filter unit according to claim 1 or the filter system according to claim 16.

22. The method according to claim 21, wherein the water is pond or aquarium water.

23. The method according to claim 21, wherein the gas is air or a waste gas.

24. Filter unit according to claim 6, wherein the natural or synthetic materials are mats, strips or threads, woven fabrics, plastics materials, foams, metal threads, iron wool, graphite, glass wool, which may optionally be hydrophilised or hydrophobised.

25. Filer unit according to claim 24, wherein the strips or threads are of coconut fibre, cork, sisal, hemp, or straw.

26. Filter unity according to claim 24, wherein the woven fabrics are of silk, cotton, cloth, paper, or polymers.

27. Filter unit according to claim 1, wherein the natural or synthetic materials are porous ceramic, sintered glass materials, or sintered plastics materials.

* * * * *